United States Patent [19]
Kennedy

[11] Patent Number: 6,031,547
[45] Date of Patent: Feb. 29, 2000

[54] COMPUTER GRAPHICAL STATUS DISPLAY

[75] Inventor: Robert D. Kennedy, San Jose, Calif.

[73] Assignee: Lam Research Corporation, Fremont, Calif.

[21] Appl. No.: 08/966,886

[22] Filed: Nov. 10, 1997

[51] Int. Cl.[7] .................................................. G06T 11/20
[52] U.S. Cl. ............................................................ 345/440
[58] Field of Search ..................................... 345/440, 140

[56] References Cited

U.S. PATENT DOCUMENTS

| | | | |
|---|---|---|---|
| 4,303,973 | 12/1981 | Williamson, Jr. et al. | 364/189 |
| 5,017,019 | 5/1991 | Pompei | 374/133 |
| 5,296,869 | 3/1994 | Jonker et al. | 345/140 X |
| 5,663,493 | 9/1997 | Gerbert et al. | 73/116 |
| 5,682,329 | 10/1997 | Seem et al. | 364/528.11 |
| 5,813,985 | 9/1998 | Carroll | 600/436 |

*Primary Examiner*—Mark K. Zimmerman

[57] ABSTRACT

A computer graphical status display for use in displays that monitor manufacturing processes having a plurality of process parameters provides a group of bar graphs placed in a side-by-side arrangement. The bar graphs are all scaled so that they have a common baseline value. When all process parameters are displayed at their baseline value, all graphs will have tops that are in alignment with the baseline. If a deviation of a graph beyond a predetermined threshold occurs, a visible warning section extending between the baseline and the top is displayed. Alphanumeric and other data can be provided to each of the graphs and the graphs can be arranged in groupings according to similar units of measure or similar process steps.

18 Claims, 5 Drawing Sheets

COMPUTER GRAPHICAL STATUS DISPLAY

FIELD OF THE INVENTION

This invention relates to a computer graphical status display and more particularly to an easily readable status display for use with semiconductor fabrication facilities and other manufacturing systems.

BACKGROUND OF THE INVENTION

In manufacturing processes, particularly those involving the fabrication of semiconductor wafers having circuit patterns thereon, computers are typically employed to control and monitor the automated manufacturing process. A variety of input/output devices (I/O) are used in the automated manufacturing process. For example, a variety of gases are employed. The gases are measured using flow meters and their introduction is controlled using valves. The temperature of gases and components is monitored at various locations. Pressure is monitored throughout the manufacturing facility. Robot manipulators are often employed. The manipulators are controlled and certain movement parameters, such as the revolutions per minute (RPM) of spinning wafers within the production facility are monitored. Likewise, other manufacturing process parameters may require monitoring at various times.

Most monitoring is accomplished using a display screen that is part of the user interface of a control computer. A conventional CRT screen is often employed. The process parameters are typically provided in alphanumeric form or as isolated graphs at a variety of locations on the display screen.

The scales used for different display graphs may vary widely. Where several plots or bar graphs for a given parameter are displayed, often the desired baseline value for each parameter varies. This causes the respective graphs to have varying sizes relative to each other. Such graphs are difficult to read at a glance, resulting in operator inefficiency, and the risk that improper readings will be made by an operator. In addition, there is often no standard for deciding whether information is to be displayed graphically, alphanumerically, or both. Warning information is also displayed in a variety of nonstandard ways.

In view of these disadvantages, it is an object of this invention to provide a computer graphical display that is more-easily readable, and standardized in format. The graphical display should be organized so that all significant parameters are clearly and logically displayed and so that all alarm conditions or unacceptable measurements are clearly indicated to the operator.

SUMMARY OF THE INVENTION

A computer graphical display, particularly for use with automated manufacturing facilities, such as those used in semiconductor fabrication, overcomes disadvantages of the prior art by providing an improved computer graphical display of significant input/output (I/O) parameter data. The graphical display displays all significant process parameters as individual bar graphs, typically organized according to type of measurement or component. A common baseline is used for all bar graphs, regardless of their actual scale. The bar graphs are displayed side-by-side so that the operator can immediately identify variations from the baseline. This baseline is established regardless of the actual scale of each bar graph, so that all bar graphs are, essentially, the same size when the underlying parameters that they represent are within acceptable limits. Alarm conditions, in which a particular parameter falls above or below an accepted value are shown in a different color and/or pattern than the underlying base section bar graph. In particular, the area between the baseline and the actual measured value for an out-of-range parameter is shown in a distinctive color and/or pattern. The bar graphs can be displayed side-by-side in a vertical or horizontal orientation on the screen. Each bar graph can be supplied with alphanumeric data that indicates the type of parameter it represents and its underlying value. Various indicia or scales can also be supplied on individual bar graphs with appropriate gradations.

BRIEF DESCRIPTION OF THE DRAWINGS

The foregoing and other objects and advantages of the invention will become more clear with reference of the following detailed description as illustrated by the drawings in which.

DETAILED DESCRIPTION OF AN ILLUSTRATIVE EMBODIMENT

Figure 1:
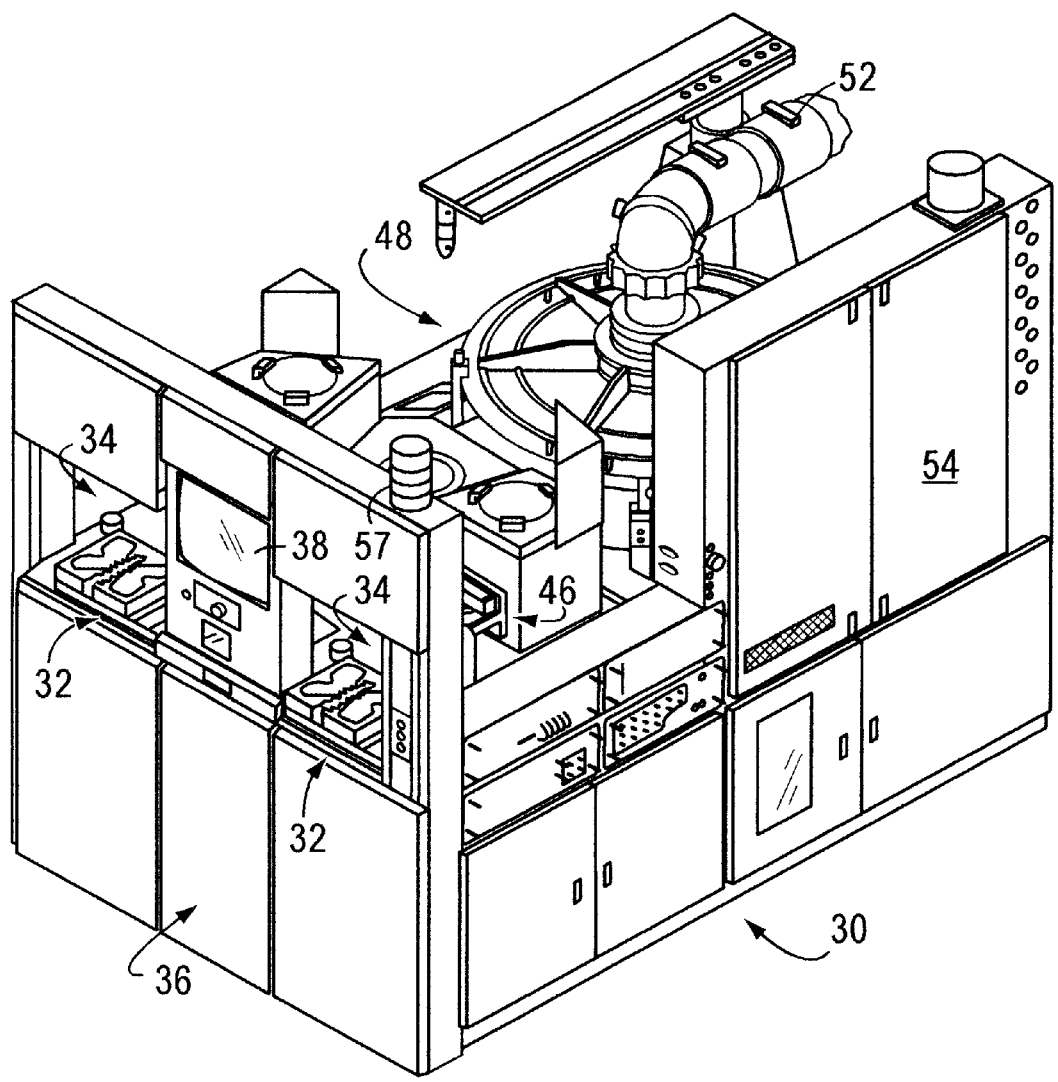
FIG. 1 is a perspective view of an automated manufacturing facility for processing semiconductor wafers and including a display screen according to this invention.
Figure 2:
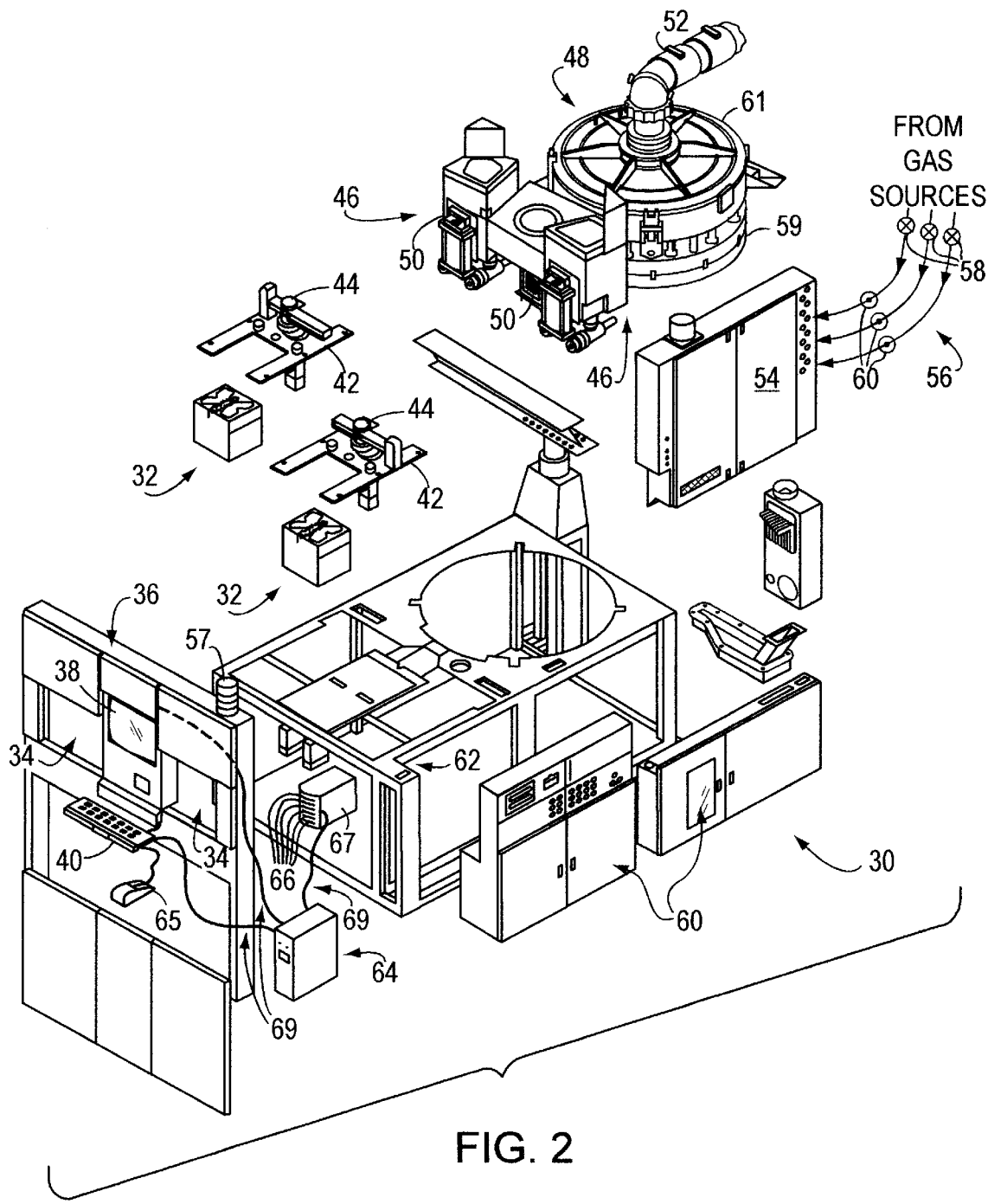
FIG. 2 is an exploded view of the facility of FIG. 1.

FIGS. 1 and 2 detail an automated semiconductor fabrication facility 30 according to this invention. Nevertheless, this description should be considered to apply to any type of manufacturing device or unit that performs multiple tasks on a workpiece, and that requires a significant number of I/O signals to be employed to control and monitor the manufacturing process. Thus, while this embodiment details the display for a semiconductor fabrication facility, the system described herein can be adapted to a variety of other processes and products. The facility shown and described herein is a modified version of the 9800 Series fabrication system available from Lam Research Corporation of Fremont, Calif. Details of the control system are provided in the copending U.S. Patent Application entitled "Modular Control System For A Manufacturing Facility," designated serial number TBD, the teachings which are expressly incorporated herein by reference.

The facility 30 includes a plurality of interrelated, but discrete, processing components that transform a group of semiconductor wafers (not shown) from an unfinished state to a completed state with applied microcircuitry patterns. In summary the fabrication facility includes send/receive indexers 32 that hold stacks of wafers, and that enable blank wafers to be loaded from the outside environment and finished wafers to be unloaded for further processing. The indexers 32 are accessed through respective openings 34 in a front end panel 36 that resides in an enhanced clean room environment to limit the introduction of foreign matter to the facility and wafers. An operator controls the processing of wafers by the facility at the front end panel through interaction with the display monitor 38 and a data entry device such as the keyboard 40.

Each of the indexers 32 includes an associated transport mechanism 42 with a manipulator arm 44 that moves wafers between the indexer stack and a respective load lock 46. The load locks 46 act as gateways to the highly controlled environment of the semiconductor process chamber 48. The loadlocks, hence, include sealed doorways 50 that selectively open and close to enable wafer transfer into and out of the process chamber 48. Wafers enter the process chamber 48 through one of the load locks 46 upon opening of the doorway 50. The process chamber 48 of this embodiment is arranged as a circular cluster of individual reactors (not shown). There is an independently controlled reactor bottom section 59 or "toroid" and a reactor top section 61. Wafers are disposed between the sections during processing, and can be moved between reactors by an internal carousel (not shown) so that different processes can be performed, and so that multiple wafers can be processed simultaneously. Finished wafers are also removed through a load locks' doorway 50.

Vacuum levels in the process chamber 48 are carefully controlled and monitored, and a vacuum/exhaust line 52 is provided. A vacuum pump (not shown) is located at the downstream end of the line 52. Process gasses are also provided to the chamber 48 through a gas panel or "gas box" 54. The gas box 54 receives selected gasses from various upstream tanks (not shown) through lines 56. The lines 56 include automated and valves 58 at one or more points along their path of travel. The valves can be pneumatically or electrically operated, like other components described herein. The lines also include signal-generating gauges at one or more locations to monitor flow and pressure. Since toxic gasses are often employed in the fabrication process, gas volumes and temperatures are carefully and fully monitored. The gas box 54 mixes, heats and regulates flow of gasses into the process chamber as required by the specific process or "recipe." Various valves, sensors and thermostatic controls (not shown) are utilized by the gas box 54.

A column of multicolored status lamps 57 is also provided at the front end panel to provide clear indications of operation and safety conditions to operators and bystanders. Other distribution and control components 60 are also provided. These are not discussed in detail, and should be known to those of ordinary skill.

Within the frame 62 of the fabrication facility also resides the master control computer 64. The computer of this embodiment can comprise an Octane™ system computer available from Silicon Graphics Incorporated (SGI) of Mountain View, Calif. This computer uses an SGI version of the well-known UNIX operating system called IRIX™, and includes dual central processing units (CPUs) that enable applications to be run simultaneously. One or both of the CPUs can be tasked with the display of data on a user interface according to this invention. The computer 64 is interconnected with the display screen 38 and keyboard 40 according to this invention. A conventional mouse 65 can also be provided for manipulating a screen cursor. A touchscreen can also be employed. Communication between the I/O of the facility and the master control computer 64 are provided by a series of interface cards 66 residing in a framework 67. The arrangement and operation of the interface cards is described in the above-described copending US Patent Application. Appropriate cabling is provided to connect all I/O to the interface cards 66. Cabling 69 is also provided to connect the interface cards 66, screen 38, keyboard 40 and all other user interface and peripheral devices to the master control computer 64.

The operating system of the master control computer 64 is generally provided with a window environment graphical user interface that is preferably displayed on the screen 38 as a graphical display to facilitate interactions between a user and the computer 64. The graphical display is typically arranged to resemble a desktop and each application program executes in an application window of the screen 38.

The window environment is generally part of the operating system software that includes a collection of utility programs for controlling the operation of the computer 64. The operating system, in turn, interacts with the application program to provide higher level functionality, including a direct interface with the user. Specifically, the application program makes use of operating system functions by issuing a series of task commands to the operating system which then performs the requested task. For example, the application program may request that the operating system display certain information on the windows for presentation to the user.

The invention herein features, along with these windows, the provision of a new graphic control element which, when invoked, cause actions to take place that enhance the ability of a user to interact with the computer system. This new behavior of the system is brought about by the interaction of this element with a series of system software routines associated with the operating system. These system routines, in turn, interact with the application program to create the windows, and manage the control element, as described further herein.

Figure 3:
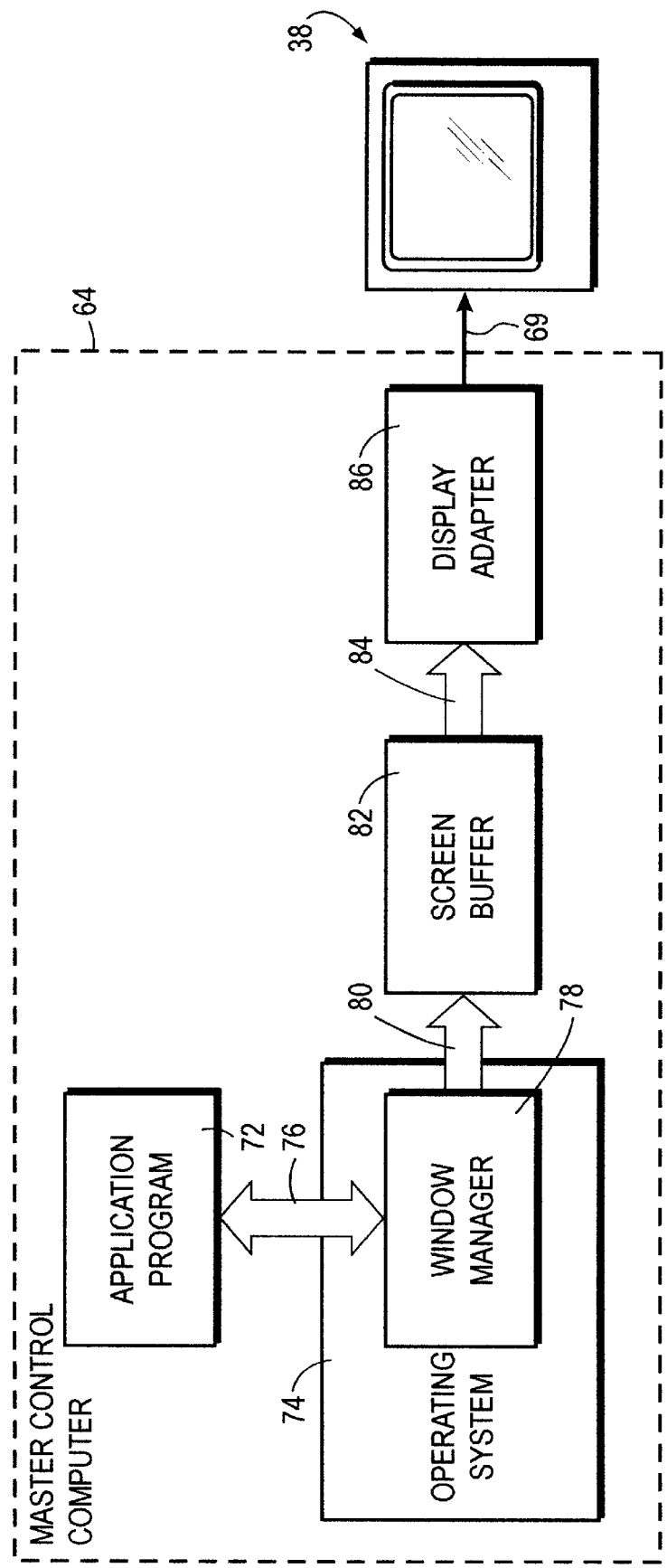
FIG. 3 is a schematic diagram illustrating the control of a graphical display according to an embodiment of this invention.

FIG. 3 is a schematic illustration of the interaction of an application program 72 and an operating system 74 (UNIX-based herein) of the master control computer 64. The application program 72 and the operating system 74 interact to control and coordinate the operations of the computer 64 and their interaction is illustrated schematically by arrow 76. In this embodiment, the application program can include the I/O control and display procedure through which a user can operate and monitor various functions of the facility. In order to display information on a screen display 38, application program 72 generates and sends display commands to a window manager program 78 of the operating system 74. The window manager program 78 stores information directly (via arrow 80) into a screen buffer 82.

The window manager 78 is a system software routine that is generally responsible for managing the windows that the user views during operation of the application program. That is, it is generally the task of the window manager to keep track of the location and size of the window and window areas which must be drawn and redrawn in connection with the improved graphic control of the present invention.

Under control of various hardware and software in the system, the contents of the screen buffer 82 are read out of the buffer and provided, as indicated schematically by arrow 84, to a display adapter 86. The display adapter 86 contains hardware and software (sometimes in the form of firmware) which converts the information in the screen buffer 82 to a form which can be used to drive a display screen 38 by the cable 69.

In general, the application program interfaces with the window manager 78 by creating and manipulating objects. The window manager itself is an object which is created when the operating system74 is started. Specifically, the application program 72 creates window objects that cause the window manager to create associated windows on the display screen. In addition, the application program 72 creates individual graphic control objects that are stored in each window object.

Figure 4:
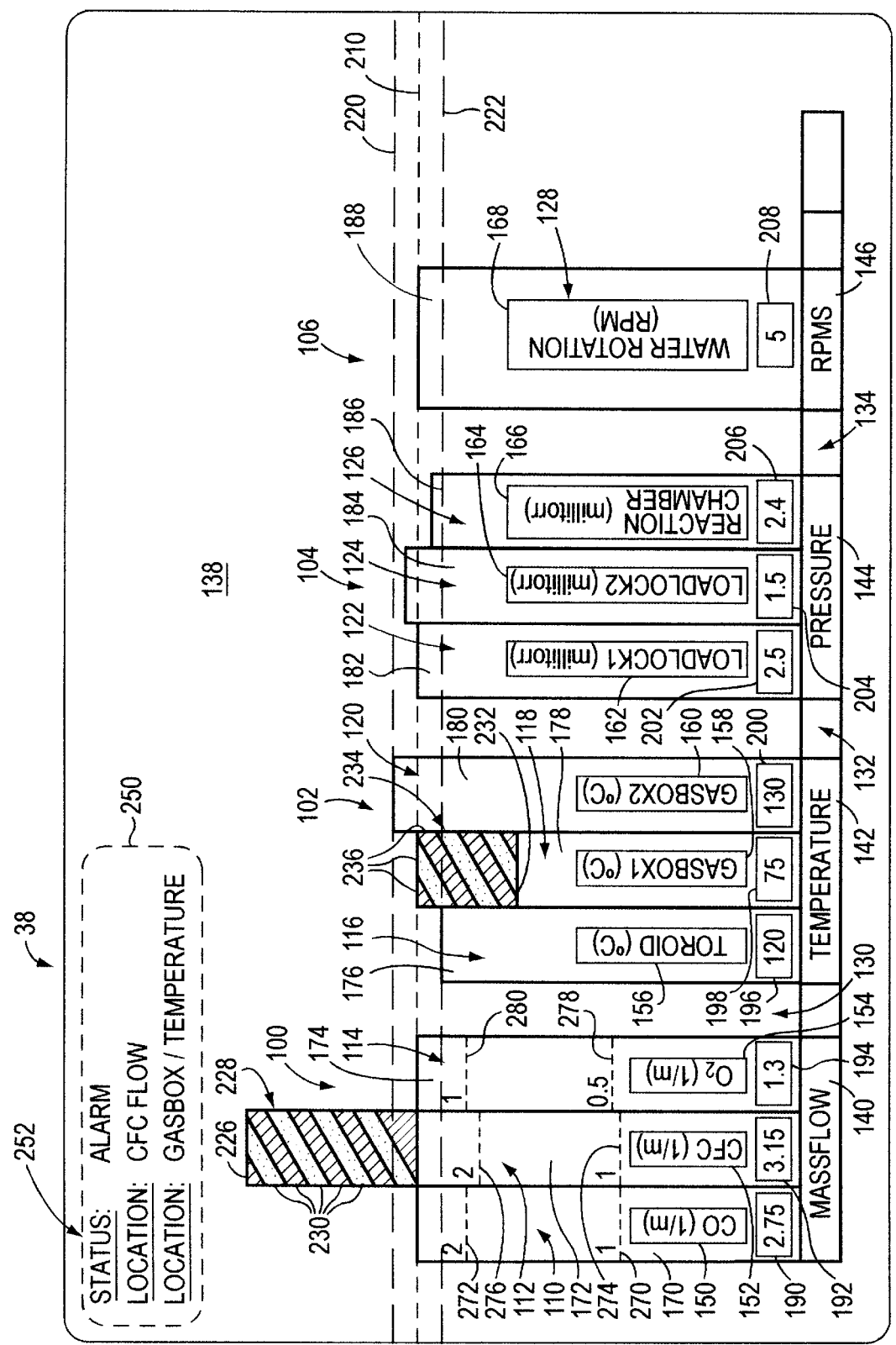
FIG. 4 is plan view of a graphical display of process parameters according to an embodiment of this invention.

Referring to FIG. 4, a computer graphical display adapted to appear on the display screen 38 is detailed. The display can reside in one window or a plurality of windows, each accessed by the user as needed. This exemplary embodiment includes four groupings 100, 102, 104 and 106 of bar graphs. Each of these groupings represents, respectively, mass flow, temperature, pressure and revolutions per minute (RPM) at which semi-conductor wafers rotate within the reaction process. It is expressly contemplated that a larger number of groupings, smaller number of groupings, or different underlying parameters can be represented according to this invention.

Each grouping comprises individual bar graphs representing the specific parameters to be measured within the grouping. In particular, the mass flow grouping 100 includes a CO bar graph 110, a CFC bar graph 112 and an $O_2$ bar graph 114. Likewise the temperature grouping 102 includes a toroid temperature bar graph 116 and first and second gas box bar graphs 118 and 120. The pressure grouping 104, likewise, includes bar graphs 122 and 124, respectively corresponding to the first and second loadlock pressures and a bar graph 126 corresponding to the reaction chamber pressure. Finally, a single RPM bar graph 128 is displayed for grouping 106. The groupings are organized in this embodiment, according to type of units (e.g., mass flow in liters per minute, temperature in degrees C., pressure in millitorr and rotary motion in RPM).

While groupings of bar graphs are made according to type of units, it is expressly contemplated that groupings can be made based on other organizational standards such as individual components. In such an alternate embodiment, bar graphs for mass flow, temperature and pressure could be combined in a single grouping. This would be desirable if the operator wishes to monitor particular stages of a process on a component-by-component basis, for example. Then all parameters relevant to the reaction chamber could be shown in a single grouping. Groupings are separated by respective boundaries 130, 132 and 134 that can be provided with a specified color or pattern or can simply be part of the background screen color 138. The base of each grouping includes a block 140, 142, 144 and 146 that includes an alphanumeric indicia that identifies the particular grouping. The blocks 140, 142, 144 and 146 are located at the "origin" of the bar graphs. This value may be zero in the given units specified or some other minimum value. It is the location of the baseline 210, that is significant according to this invention. This is described in detail further below Hence, according to this embodiment, clearly visible sections are displayed, extending from the baseline 210 to the actual top of a bar graph when that bar graph falls outside of the accepted range of standard operating values. A threshold 220,222, according to this embodiment, is displayed in a clearly visible form that immediately alerts the operator of an unacceptable parameter value. As noted above, the threshold for each graph, before it displays the warning section can be varied from graph-to-graph. If a particularly narrow threshold is required, then any deviation from the baseline can cause the display of the warning section.

Other alarms, including displayed flags, audible buzzers and automatic shutdown of equipment can also occur if a parameter deviates sufficiently from its predetermined threshold.

The display screen 38 can also include a box 250 for displaying alphanumeric status information 252 related to the measured parameters. Other user interface information (not shown) required for the operation of the manufacturing facility can also be displayed in a variety of boxes and windows.

It is contemplated that the bar graphs can be displayed in any acceptable graphical user interface format. For example, the display screen 38 can selectively display to several different pages, each including a grouping of bar graphs. The user interface can include functions for enlarging and reducing the size of the display and for independently varying its length and width on the screen. The CO, CFC and $O_2$ graphs 110, 112 and 114 respectively include indicia indicating the relative scale. The respective pairs of indicia 270 and 272, 247 and 276, and 278 and 280 each comprise horizontal lines and an alphanumeric integer value. For example, the indicia 270 shows the line on the relative scale in which one liter/minute appears. Likewise, the indicia 272 indicates the line where two liters/minute appears on the relative scale. Note that the indicia 278 and 280 of the $O_2$ graph 114 are, respectively 0.5 liters/minute and 1 liter/minute, roughly half the scale of the CO graph 110. The indicia can further aide an operator in quickly ascertaining the relative values of each process parameter.

Figure 5:
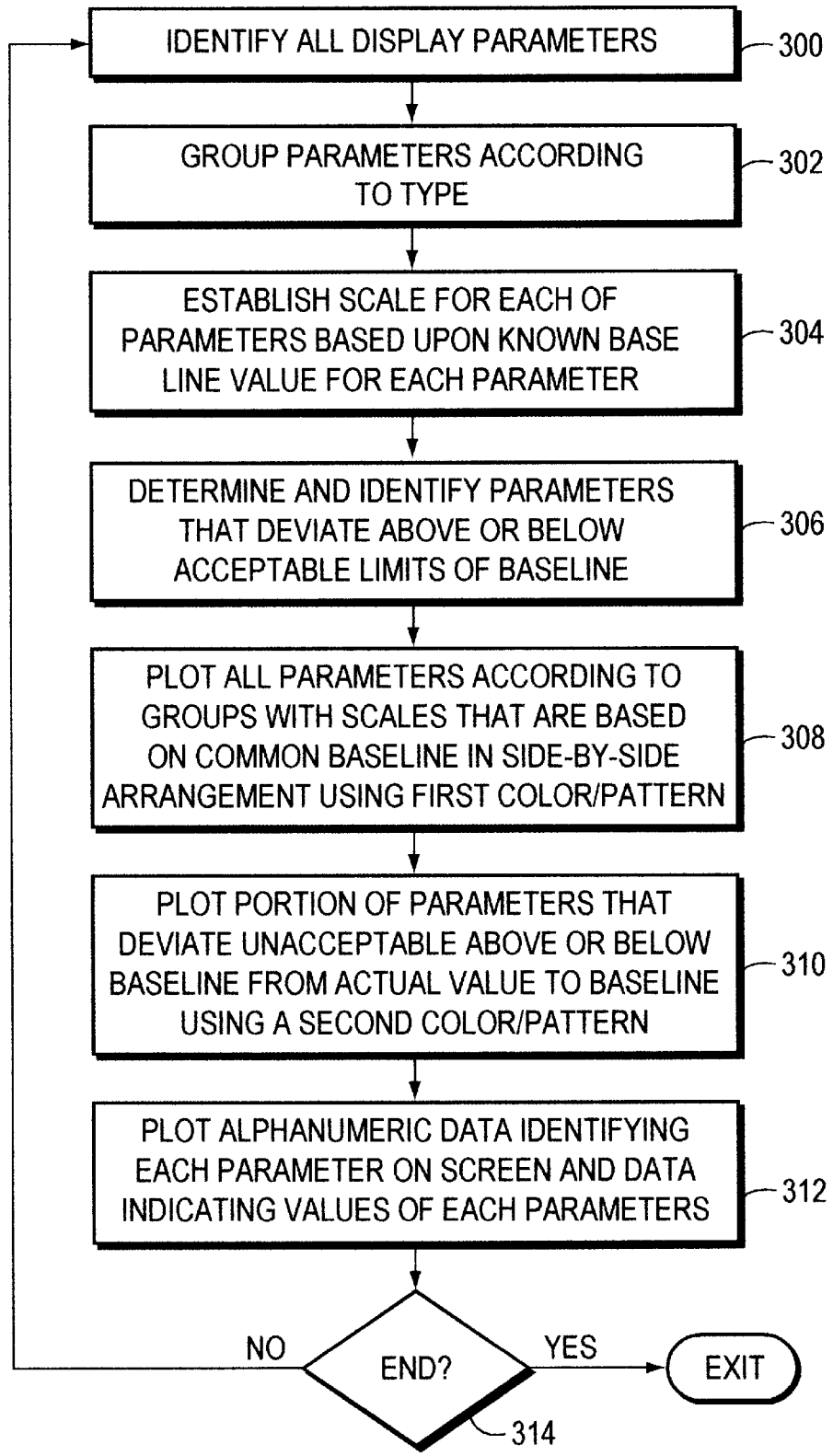
FIG. 5 is a flow diagram of the procedure for producing the graphical display of FIG. 4.

FIG. 5 illustrates a flow chart describing a basic procedure for generating a graphical display according to this invention. In step 300 the display parameters are identified. Knowing the number of parameters enables the system to allocate the width of each bar graph relative to a given overall width allocated on the display screen. The more bar graphs to be displayed, the narrower each bar graph must be to occupy a given width. Conversely, the fewer bar graphs present, the wider each may be. In an alternate embodiment, all bar graphs are the same width regardless of number. Next, parameters are grouped according to type as detailed in step 302. The grouping can occur according to units such as mass flow, temperature, etc., or the groupings can occur according to other standards, such as process component. The standards by which components are grouped can be varied to suit the particular operation. Likewise, it is contemplated that no specific grouping may occur and that all bar graphs can be displayed with equal spacing therebetween and no underlying relation between adjacent bar graphs.

In step 304, the scale for each of the parameters established. A known, predetermined, baseline value for each parameter is used to determine a scale, into all parameters in the display. For example, if a first parameter's baseline is two units and a second parameter's baseline is one unit, the scale of the first parameter would be one-half that of the second parameter. In general, a scale factor for each parameter is chosen so that all baselines are equal across the graphical display.

In step 306 parameters that deviate above or below the accepted baseline for that parameter are identified. The amount of deviation above or below the accepted threshold is calculated and scaled according to the particular parameter's scale factor.

In step 308, the parameters are plotted as individual bar graphs, clustered in groups, if any. The stop of each bar graph is located at above or below the baseline depending upon actual deviation. Graphs that fall within accepted thresholds are plotted as a solid color base section only.

In step 310 parameters that have been identified as deviating from accepted thresholds are plotted to include a highlighted, warning section with a different pattern and/or color than the base section. The warning section is plotted so that it extends from the baseline to the actual top of the parameter's bar graph. Finally, in step 312, the alphanumeric data identifying each parameter, its values and, if applicable, any scale indicia, are plotted. This data can be plotted within the bar graph or at some location adjacent the bar graph. The titles of individual groups can also be plotted at this time.

The process continues to refresh the graphs until a command to end or exit (decision block 314 is entered). Graphs can be replotted in a continuous cycle based upon existing parameter measurements or changes in measurements can be used to trigger replotting of graphs.

The foregoing has been a detailed description of a preferred embodiment. Various modifications and additions can be made without departing from the spirit and scope of this invention. For example, curved or partially curved graphs are also contemplated. Bar graphs need not be solid lines, but can comprise a series of segments, each having arbitrary size or corresponding to scale indicia for the particular parameter. Finally, additional colors and patterns can be employed to indicate different levels of deviation from the baseline. For example, an additional color and/or pattern can be used to show a deviation from the baseline that does not exceed a threshold. Likewise, a deviation that enters a clear danger zone can be shown in yet another color or pattern, such as flashing red. Finally, flashing graph sections and/or sections that change color or pattern can also be used to attract an operator's attention to significant conditions. Accordingly, this description is meant to be taken only by way of example and not to otherwise limit the scope of the invention.

What is claimed is:

1. A computer graphical status display for use in displays that monitor manufacturing processes in which a plurality of discrete process parameters exist, comprising:

a plurality of bar graphs each being parallel to each other and extending from a common origin to a top, each of the bar graphs representing a respective of the plurality of discrete process parameter values, each of the process parameter values having a respective of a plurality of desired baseline values, and each of the bar graphs being scaled so that each of the baseline values is located at an equal distance to the other of the baseline values from the origin; and an alarm indication which is triggered when an individual bar graph falls below or above a minimum or a maximum permissible value for that parameter, respectively, wherein the alarm indication comprises a warning section extending from the baseline to an actual measured value for an out-of-range parameter bar graph defined by at least one of a color and or pattern that differs from a color and or pattern of a portion of the bar graph extending between the origin and the warning section.

2. The computer graphical status display as set forth in claim 1 further comprising alphanumeric information identifying the respective of the process parameters located adjacent respective of the bar graphs.

3. The computer graphical status display as set forth in claim 2 wherein selected of the plurality of bar graphs are organized adjacent each other in a predetermined grouping, the predetermined grouping being based upon predetermined standards.

4. The computer graphical status display as set forth in claim 3 wherein the predetermined standards comprise units of value.

5. The computer graphical status display as set forth in claim 1 further comprising a threshold section defining accepted minimum and maximum permissible values for each of the discrete process parameters, wherein the bar graph remains free of the warning indication while the top of the bar graph remains in the threshold section.

6. The computer graphical status display as set forth in claim 5 further comprising alphanumeric information identifying the respective of the process parameters located adjacent respective of the bar graphs.

7. The computer graphical status display as set forth in claim 6 wherein selected of the plurality of bar graphs are organized adjacent each other in a predetermined grouping, the predetermined grouping being based upon predetermined standards.

8. The computer graphical status display as set forth in claim 7 wherein the predetermined standards comprise units of value.

9. The computer graphical status display as set forth in claim 7 wherein the plurality of discrete process parameter values have units of measure that are unrelated.

10. The computer graphical status display as set forth in claim 5 wherein the threshold section is equidistant for each of the process parameters.

11. The computer graphical status display as set forth in claim 5 wherein the threshold section varies for each of the process parameters.

12. The computer graphical status display as set forth in claim 5 wherein the alarm indication further comprises a flag.

13. The computer graphical status display as set forth in claim 5 wherein the alarm indication further comprises an audible tone.

14. The computer graphical status display as set forth in claim 13 wherein the audible tone is a buzzer.

15. The computer graphical status display as set forth in claim 5 wherein the alarm indication further comprises a flashing section of bar graph.

16. The computer graphical status display as set forth in claim 5 wherein an alarm indication results in an automatic shutdown of equipment.

17. The computer graphical status display as set forth in claim 1 wherein the alarm indication further comprises a flashing section of a bar graph.

18. The computer graphical status display as set forth in claim 1 wherein an alarm indication results in an automatic shutdown of equipment.

* * * * *